Dec. 4, 1934. J. D. BENBOW ET AL 1,983,433
DUMP WAGON
Original Filed April 17, 1928 4 Sheets-Sheet 1
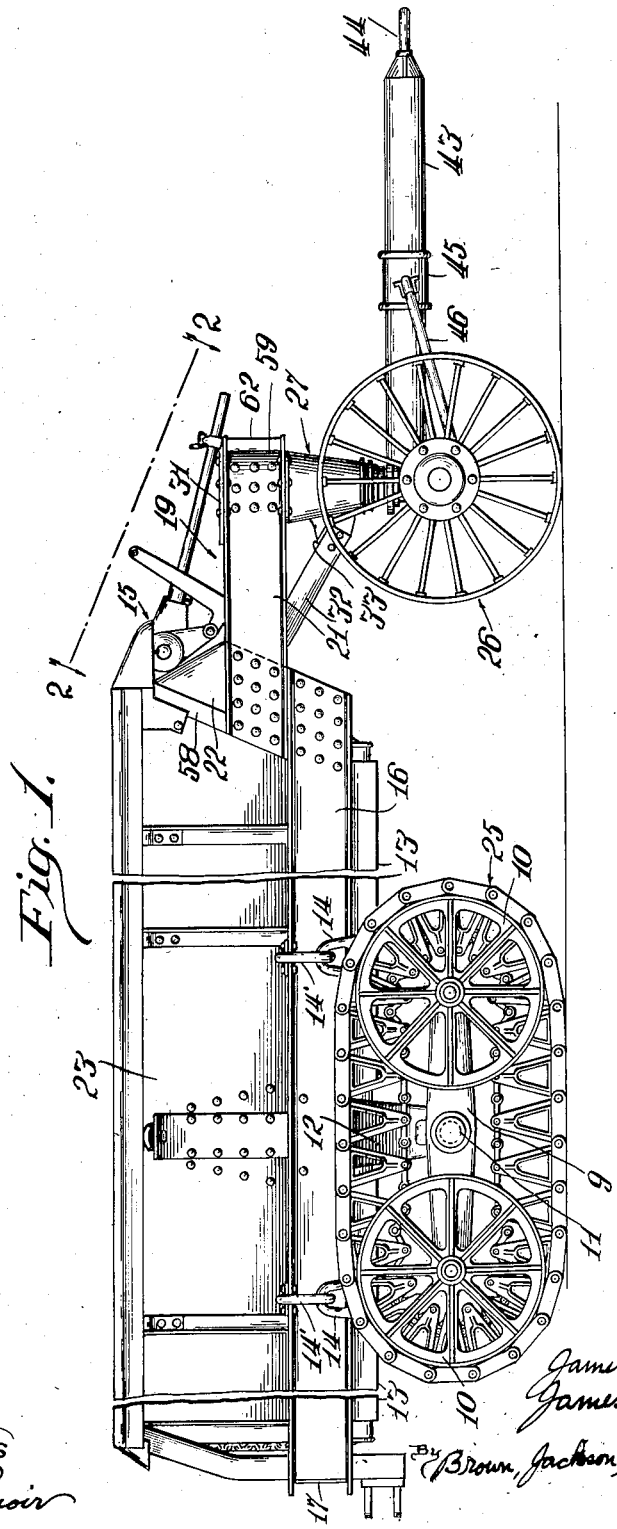

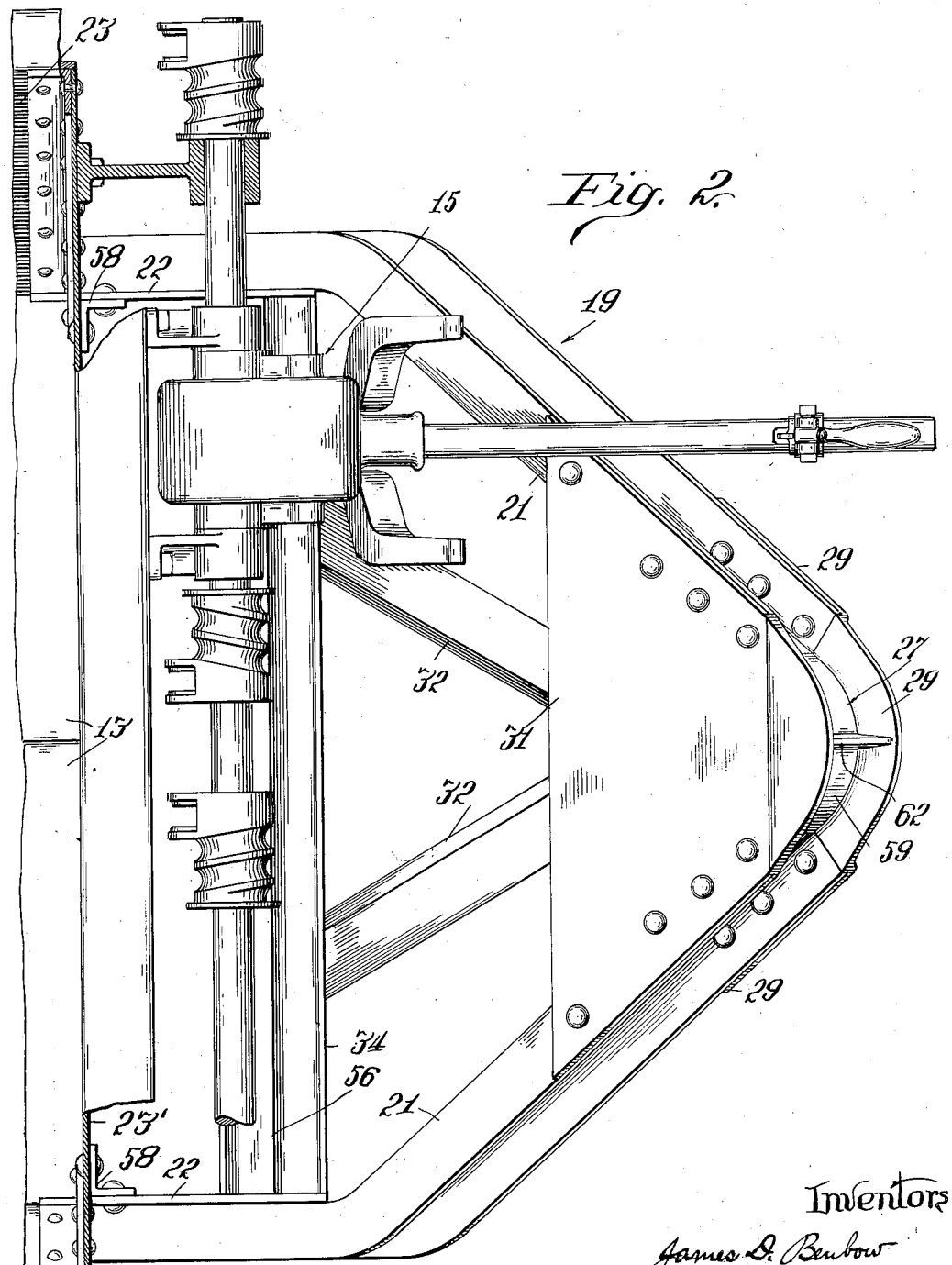

Dec. 4, 1934.                J. D. BENBOW ET AL                 1,983,433
                                DUMP WAGON
                   Original Filed April 17, 1928    4 Sheets-Sheet 3
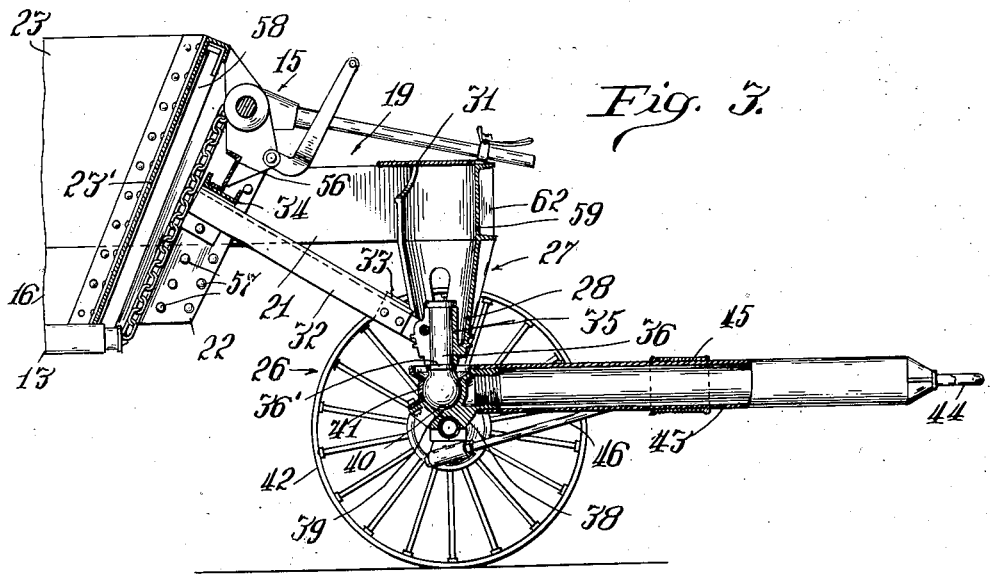

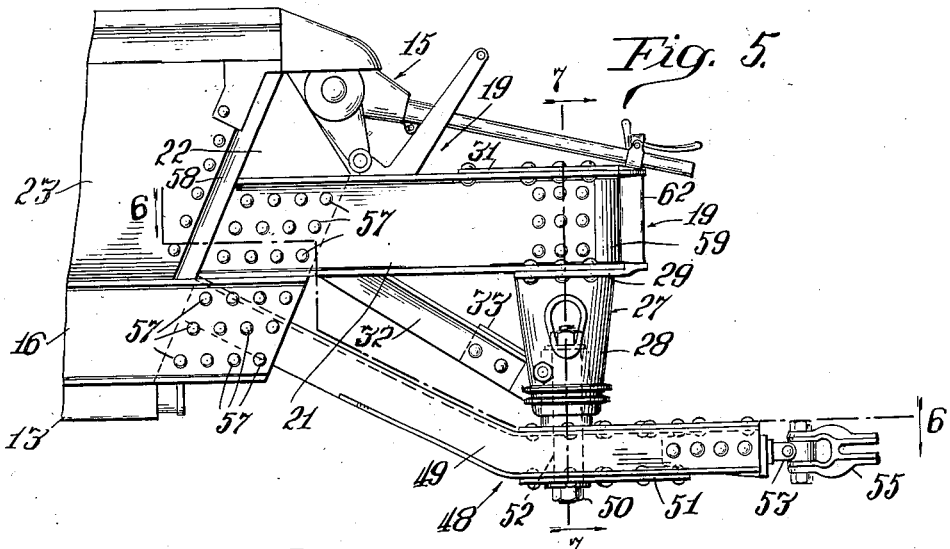
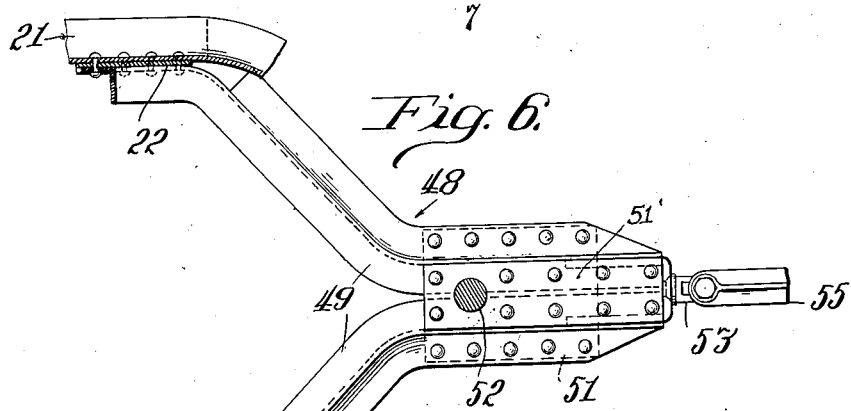
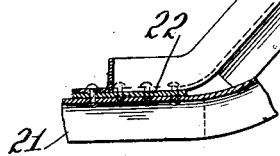

Patented Dec. 4, 1934

1,983,433

UNITED STATES PATENT OFFICE 1,983,433

DUMP WAGON

James D. Benbow and James B. Green, Aurora, Ill., assignors, by mesne assignments, to Western-Austin Company, Aurora, Ill., a corporation of Illinois Original application April 17, 1928, Serial No. 270,745. Divided and this application February 14, 1929, Serial No. 339,821

10 Claims. (Cl. 280—33.44)

The present invention relates to dump wagons and is divisional of our prior Patent No. 1,706,099, issued March 19, 1929. Such prior application is directed broadly to a bottom dump wagon wherein the load carrying bed is supported on endless, self-laying tracks or treads, having the particular advantage of sustaining a very heavy load in soft soils. The present application is directed primarily to the construction and support of the front end of the wagon.

One of the objects of the invention is to provide an improved construction and arrangement of wheeled forecarriage for the front end of the wagon, together with an improved construction of pivot bracket therefor, whereby the forecarriage or truck can be readily removed in adapting the wagon to situations where the front end thereof is supported directly on the tractor or other vehicle pulling the wagon.

Another object of the invention is to provide an improved front frame structure for the wagon embodying an improved relation and manner of joining the same to the main frame bars, and embodying improved means for reinforcing the end of the bed.

Other objects and advantages of the invention will appear in the following description of a preferred embodiment thereof. In the accompanying drawings illustrating such embodiment:

Figure 1 is a side elevational view of the improved wagon, intermediate portions of the bed being broken away at opposite ends of the tread units to illustrate the wagon on a larger scale.

Figure 2 is a top perspective view of the front end construction, as viewed on the plane of the line 2—2 of Figure 1, an intermediate portion of this view also being broken away to illustrate the construction on a larger scale.

Figure 3 is a vertical longitudinal sectional view through the front frame structure and illustrating the mounting of the same on the front truck or forecarriage.

Figure 4 is a fragmentary plan view showing the front frame structure mounted on a truck.

Figure 5 is a side elevational view of the front construction, illustrating the truck or forecarriage removed and the hitch connection altered for supporting the front end of the wagon directly on the tractor or other pulling vehicle.

Figure 6 is a horizontal sectional view of this front draft connection, taken approximately on the plane of the line 6—6 of Fig. 5, and Figure 7 is a vertical sectional view taken on the plane of the line 7—7 of Fig. 5.

The main frame of the wagon comprises two longitudinal beams 16, constituting the side sills of the wagon bed, said beams, preferably being of channel cross section. The rear ends thereof are joined by a transverse channel beam 17 which is suitably secured to the longitudinal beams 16 by gusset plates riveted to the adjoining ends of the three beams. The front ends of the side beams 16 are secured to an elevated front frame structure 19, comprising two channel bars 21 projecting forwardly from and above the ends of the side beams 16. Plates 22 extend upwardly along the inner sides of the overlapping ends of the channels 16 and 21, and are riveted to both channels for joining the same together. The bed of the wagon is of hopper shape having sloping side walls and comprises plates 23 which are secured to the frame structure in any suitable manner.

The self-laying track or endless tread units are indicated at 25, it being noted that these units are disposed approximately midway between the ends of the load carrying bed so that the treads carry practically all of the load. Each endless tread unit comprises a rocker beam 9 at the ends of which are pivotally mounted wheels 10 over which pass the series of interconnected links or shoes making up the treads. Any preferred construction of tread unit can be employed. Each rocker beam 9 is pivotally supported intermediate its ends on a stub axle 11 projecting outwardly from an axle bracket 12 depending from the main frame. These axle brackets form in effect, with the main frame bars 16, a transverse arched axle structure for supporting the bed and main frame a sufficient distance above the pivotal axis 11 of the tread units to permit the dumping doors to swing downwardly without striking the ground and to permit the dumping of a substantially full load below the bed. Transverse reinforcing means may or may not be extended between the upper portions of the axle brackets 12, such, however, forming no part of the present invention. The dumping doors are indicated at 13, such doors having apertured hinge brackets 14 along their lateral edges which connect with cooperating hinge brackets 14' secured to the side bars 16 of the frame. There may be two pairs of these doors, one pair disposed forwardly of the axle brackets 12 and the other pair disposed rearwardly thereof, or only a single pair of doors may be employed extending entirely from end to end of the dumping bed. Suitable hoisting chains or like flexible members connect with these doors and extend forwardly to hoisting mechanism located at the front end of the wagon and indicated generally at 15. The improvements residing in this hoisting mechanism, and the arrangement of the hoisting chains, has been made the subject matter of a divisional application Serial No. 330,556 filed January 5, 1929, and the improvements residing in the construction of the dump doors 13 have been made the subject matter of a divisional application filed of even date herewith.

In most instances, the front end of the wagon will be supported on a wheeled truck 26, although the construction is such that this wheeled truck can be easily removed so that the front end of the wagon may be mounted directly on the tractor or other pulling vehicle. Referring to the construction by which this is made possible, it will be seen from Figures 2, 3, 5 and 7, that the converging front ends of the channel bars 21 are secured to the sides of a vertical pivot bracket 27 extending downwardly from the front frame structure 19. The bracket comprises a hollow tapering portion 28 having lateral flanges 29 projecting therefrom, on which the lower flanges of the channel bars 21 rest and to which they are secured. A triangular plate 31 extends across the upper sides of the channel bars 21 and is riveted to the upper flanges thereof (Fig. 2). Two inclined brace bars 32 have their lower ends secured to step-like extensions 33 projecting rearwardly from the bracket 27. Referring to Fig. 2, these brace bars diverge laterally and have their upper ends secured to a transverse channel bar 34 (Fig. 3) extending between the two side plates 22. Referring to Fig. 7 a cylindrical bearing socket 35 is formed integral with the bracket 27 and extends upwardly into the hollow portion 28 thereof. When the wheeled truck 26 is to be employed, a king-pin 36 is placed in the bearing socket 35, this king-pin comprising a cylindrical upper shank portion and a ball end 37, as shown in Fig. 3. A shoulder 36' at the lower end of the shank portion 36 bears against the lower end of the bearing socket 35, and the shank portion and ball end are hollow for the introduction of a lubricant which can pass outwardly through holes 40 in the shank portion and in the ball end to the bearing surfaces contacting with these portions. The transverse axle 38 of the truck is provided with a spherical socket 39 in which the spherical end 37 of the king-pin seats. The socket comprises a solid or permanently joined bottom and front wall portion, and a removable ball retaining cap portion 41 of segmental or arcuate form adapted to close the back and upper rear portion of the socket. The assembly of the socket over the ball end is completed by the bolting of this ball retaining cap portion to the open rear side of the socket after the ball has been mounted therein. The wheels 42 are mounted on spindles projecting from the ends of the axle 38. A draft tongue 43 is rigidly secured to said axle and has a coupling eye 44 at its front end adapted for establishing a coupling hitch with the tractor.

A collar 45 secured to the draft tongue 43 has brace rods 46 extending diagonally rearwardly therefrom, said brace rods being secured to the spindle ends of the axle and bracing the connection between the axle and the draft tongue. It will be seen that the ball and socket joint established between the frame of the wagon and the wheeled truck 26 affords a fifth wheel around which the truck can swing to steer the wagon, and which also permits lateral rocking of the truck in passing over uneven ground, and permits vertical tilting of the draft tongue 43 in relative fore-and-aft tilting movement between the tractor and the wagon.

When it is desired to support the front end of the wagon directly on the tractor, the wheeled truck 26 is removed by simply withdrawing the king-pin 36 from the bearing socket 35. Thereupon, a hitch member, such as is shown in Figures 5, 6, and 7, is substituted for the truck. This hitch member, designated 48 in its entirety, comprises two bars 49, preferably of Z-bar section, having their parallel front ends joined together by plates or any other suitable form of bracket structure 51. The rear portions of the bars 49 are bent upwardly and are separated laterally for attachment to the inner sides of the main frame bars 16, as shown in Fig. 6. The outwardly projecting flanges of these Z-bars terminate short of the rear ends of said bars so that the vertical webs thereof can be secured to the frame bars of the wagon. The bracket structure 51 carries a pin 52 extending upwardly into the bearing socket 35 and held therein by a nut 50 screwing over a reduced upper end of the pin and engaging with the upper end of the bearing socket. A draft coupling 53 extends forwardly from the front end of the hitch member 48 for establishing pivot coupling with the tractor and for supporting the weight of the front portion of the wagon on the tractor. The tractor draw-bar is indicated at 55.

It will be seen from the foregoing that to convert the wagon from a type which has its front end supported on a wheeled truck to a type which has its front end supported directly on the tractor, or vice versa, entails no alteration or change in design of the front frame construction. As previously described, the wheeled truck 26 is removed by simply withdrawing the king pin 36 from the bearing socket 35, and thereupon the hitch member 48 can be substituted therefor by merely inserting the pin 52 of such hitch member upwardly into the bearing socket and holding the pin in place by the nut 50 and then securing the rear ends of the diverging bars 49 to the inner sides of the frame bars 16. Said diverging bars may be riveted to the frame bars 16 if such adaptation is to be permanent, or they may be bolted to said frame bars if it is desired to be able to quickly convert the wagon to the use of the wheeled truck 26.

By disposing the front frame bars 21 at the higher plane above the main frame bars 16 and by projecting the bracket extension 27 downwardly from the front ends of said upper frame bars, certain operating and structural advantages are obtained. The elevated position of the bars 21 gives ample clearance room to the front wheels 42 when one of such wheels swings inwardly under the frame in the steering of the truck. The downwardly projecting bracket extension 27 affords a low point of support for the wheeled truck or for the hitch connection 48. The relatively low disposal of the socket 35 affords staunch support for the king-pin 36 down approximately to the ball end 37 thereof, the ball and socket joint being disposed substantially in the transverse axis of the wheels 42. Such arrangement of the socket 35 in the lower end of the bracket extension 27 also affords a long support for the pin 52 of the draft member 48 and establishes a low point of bearing support between such draft member and the front end of the wagon. Moreover, when the wagon is uncoupled from the tractor the front end of the wagon can rest on the lower end of the bracket extension 27 or on the draft member 48.

The diverging bars 32 extending between the lower end of the bracket extension 27 and the transverse bar 34 reinforce such bracket extension against fore-and-aft and lateral stresses incident to propelling and steering the wagon. Set edgewise in the transverse channel bar 34 and secured thereto is another channel bar 56 which reinforces the bar 34 and also affords a support for certain parts of the winding mechanism 15.

The plates 22 serve the two-fold purpose of providing a simple and rigid connection between the frame bars 16 and 21, and also of reinforcing the end wall of the hopper shaped bed. The flanges of both channels 16 and 21 face outwardly, and the plates 22 extend upwardly across the inner sides of said channels, being securely riveted to the webs of both as indicated at 57 in Figure 4. The front end wall 23' of the hopper body slopes forwardly and the two plates 22 have their rear edges inclined correspondingly and substantially contacting with this end wall from top to bottom thereof. As shown in Figure 2, joining bars 58 of angle section are riveted or bolted to the end wall 23' and to the adjacent edge portions of the two plates 22. Thus, the pressure of the load bearing against the sloping front wall 23' is sustained by the plates 22 receiving such a stress edgewise, in which plane they have very large beam strength.

The downwardly projecting frame extension 27 is provided at its upper end with a head or attachment portion 59 having forwardly converging side walls 61 (Figure 7) to which the forwardly converging front ends of the frame bars 21 are riveted. The lower flanges of said frame bars 21 are also riveted to the flanges 29 projecting outwardly from the extension portion 27, and such flange or flanges 29 extend around the forward edge of the attaching portion 59 and have reinforced connection therewith through a vertical reinforcing rib 62.

As shown in Figure 7, the forward parallel ends of the two Z bars 49, making up the draft connection 48, have their upper and lower flanges joined together by the upper and lower plates 51' and 51. Such construction is of great strength both laterally and vertically, and affords a boxlike socket in the end of the draft connection 48, in which socket the coupling member 53 is riveted.

While we have described what we regard as the preferred embodiment of our invention, it will be understood that such is merely exemplary and that numerous modifications and changes may be made therein without departing from the essence of the invention.

We claim:

1. A dump wagon comprising a frame, a supporting bracket at the front end of said frame having a vertical bearing sleeve therein, a draft member detachably secured at its rear end to said frame and extending forwardly below said bracket, a pin carried by said draft member and engaging in said bearing sleeve, said draft member being removable from said frame and said pin being removable from said bearing sleeve, to permit the substitution of a wheeled front truck having a king-pin adapted to engage in said bearing sleeve.

2. In a wagon, the combination of a frame, a supporting bracket at the front end of said frame having a vertical bearing sleeve therein, a draft member detachably secured at its rear end to said frame and extending forwardly below said bracket, a pin carried by said draft member and engaging in said bearing sleeve, said draft member being removable from said frame, and said pin being removable from said bearing sleeve, to permit the substitution of a wheeled front truck having a king pin adapted to engage in said bearing sleeve.

3. In a wagon, the combination of a frame comprising main frame bars, front frame bars extending forwardly above said main frame bars, a downwardly extending bracket secured to said front frame bars, said bracket having a socket sleeve extending substantially vertically in its lower end, a draft member extending forwardly below said bracket, and a pin carried by said draft member and removably mounted in said bearing sleeve.

4. A wagon comprising side channel bars, a load carrying bed supported thereon comprising side, front and back walls, front channel bars superposed on said side channel bars with the adjacent ends of the side and front bars overlapping, said bars having their flanges projecting outwardly, joining plates secured to the web portions of said channels, and angle bars connecting said plates with the front wall of said bed for reinforcing the latter.

5. A dump wagon comprising a hopper body having a forwardly sloping front wall, a frame comprising side channel bars, a front frame structure comprising front channel bars having their rear ends superposed on said side channel bars in overlapping relation, joining plates extending upwardly along the inner sides of said channel bars and riveted to the web portions thereof, the rear edges of said plates being sloped substantially correspondingly to the slope of said front wall, and angle bars connected between the rear edges of said plates and said front wall for reinforcing the latter.

6. In a dump wagon, the combination of a frame comprising side channel bars, front channel bars superposed on said side channel bars with the adjacent ends of the side and front bars overlapping, a hopper body having a forwardly sloping front wall mounted on said frame, plates extending upwardly along the inner sides of the overlapping portions of said frame bars and being riveted to the web portions of both, means connecting said plates with the front wall of said body for reinforcing the same, and a depending bracket structure secured between the forward ends of said front channel bars and on which the front end of the wagon is supported.

7. A dump wagon comprising a hopper body comprising side, front and back walls, a frame supporting said body comprising side channel bars, front channel bars superposed on said side channel bars with the adjacent ends of the side and front bars overlapping, said bars having their flanges projecting outwardly, plates extending upwardly along the inner sides of the overlapping portions of said bars and being riveted to the web portions of both, means connecting the rear edges of said plates with the front wall of the hopper body for reinforcing said front wall, a transverse bar extending between the rear portions of said front frame bars, the forward portions of said front frame bars converging towards each other, a depending bracket structure secured between said converging front ends, brace bars secured to the lower portion of said bracket structure, said brace bars diverging laterally, and extending upwardly and rearwardly for attachment to said transverse bar, a front truck, means pivotally connecting said truck with said depending bracket structure for lateral steering movement, and rolling ground engaging members on said front truck.

8. In a dump wagon, the combination of a frame comprising side frame beams, a bottom dump bed mounted on said side beams, rolling, ground engaging members supporting said side beams, a front beam structure secured to said side beams and projecting forwardly beyond the front end of said bed substantially above the plane of said side beams, and a downwardly extending supporting member secured to the forward portion of said front beam structure and serving to support the front end of the wagon.

9. A dump wagon of the class described comprising a main frame including longitudinally extending side sill beams, a load carrying bed supported thereon comprising side walls and front and rear end walls extending upwardly from said main frame, said sill beams having their front ends projecting forwardly beyond said front end wall of the bed, a front frame structure projecting forwardly beyond the front ends of said sill beams, said front frame structure comprising two laterally spaced structural bars disposed in a plane above the front ends of said sill beams, means effecting rigid attachment between the rear ends of said structural bars and the forwardly projecting front ends of said sill beams, a bracket secured between the front ends of said structural bars and comprising a portion depending from said structural bars, and means connected with the depending portion of said bracket for establishing a draft connection with a pulling vehicle.

10. A dump wagon comprising a main frame including longitudinally extending side sill beams, a load carrying bed supported thereon comprising side walls and front and rear end walls extending upwardly from said main frame, said side sill beams having their front ends projecting forwardly beyond said front end wall of the bed, a front frame structure projecting forwardly beyond the front ends of said sill beams, said front frame structure comprising two laterally spaced structural bars disposed in an elevated position with respect to the front ends of said sill beams, means effecting rigid attachment between the rear ends of said structural bars and the forwardly projecting front ends of said sill beams, and a bracket secured between the front ends of said structural bars and comprising a portion depending from said structural bars.

JAMES D. BENBOW.
JAMES B. GREEN.